Jan. 1, 1963   M. McCORKLE   3,070,957
LIQUID SEPARATOR, VAPOR-GAS INJECTION STEERING SYSTEM
Filed March 16, 1961   2 Sheets-Sheet 1
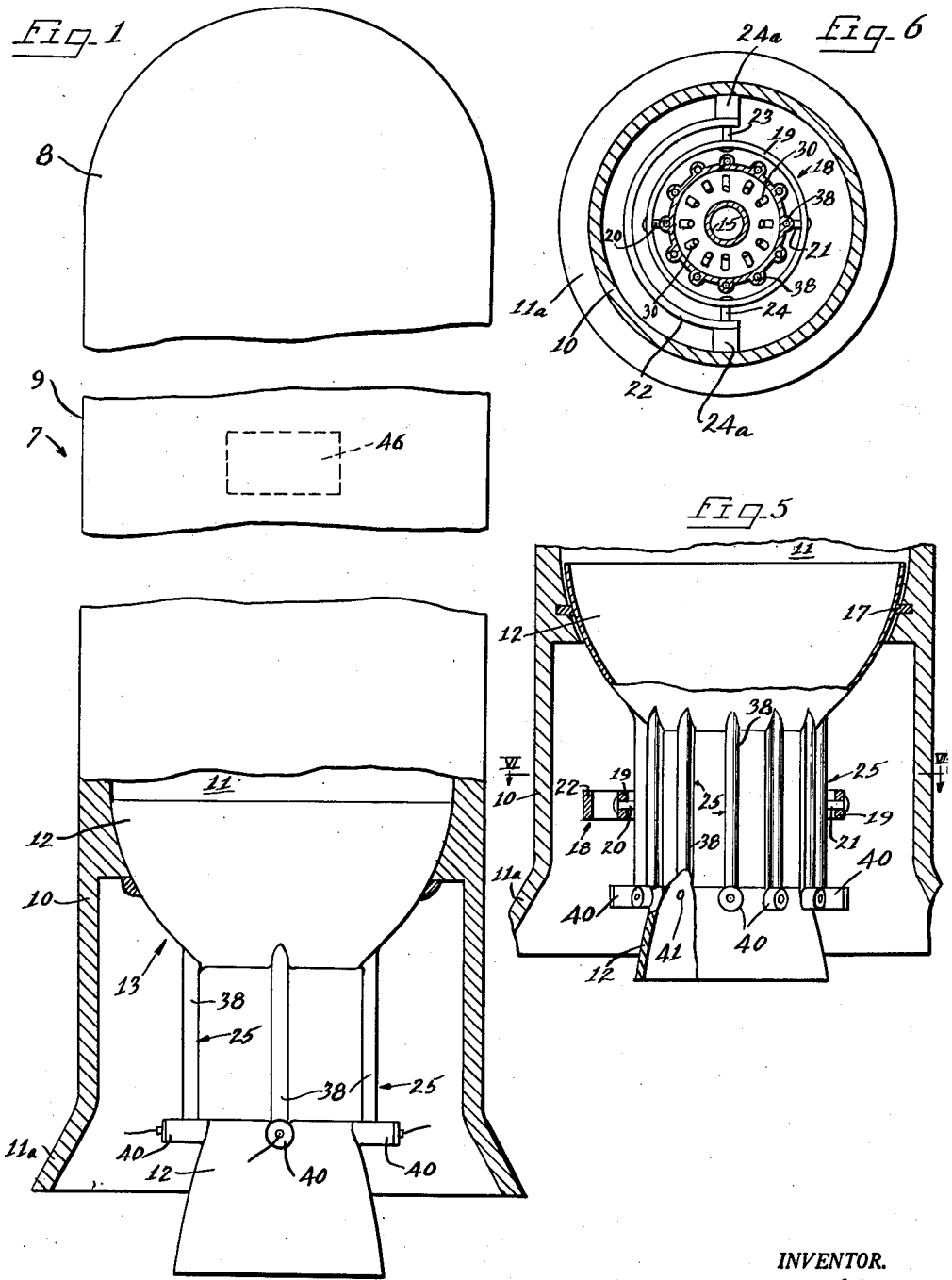
INVENTOR.
Max McCorkle
BY
ATTORNEYS

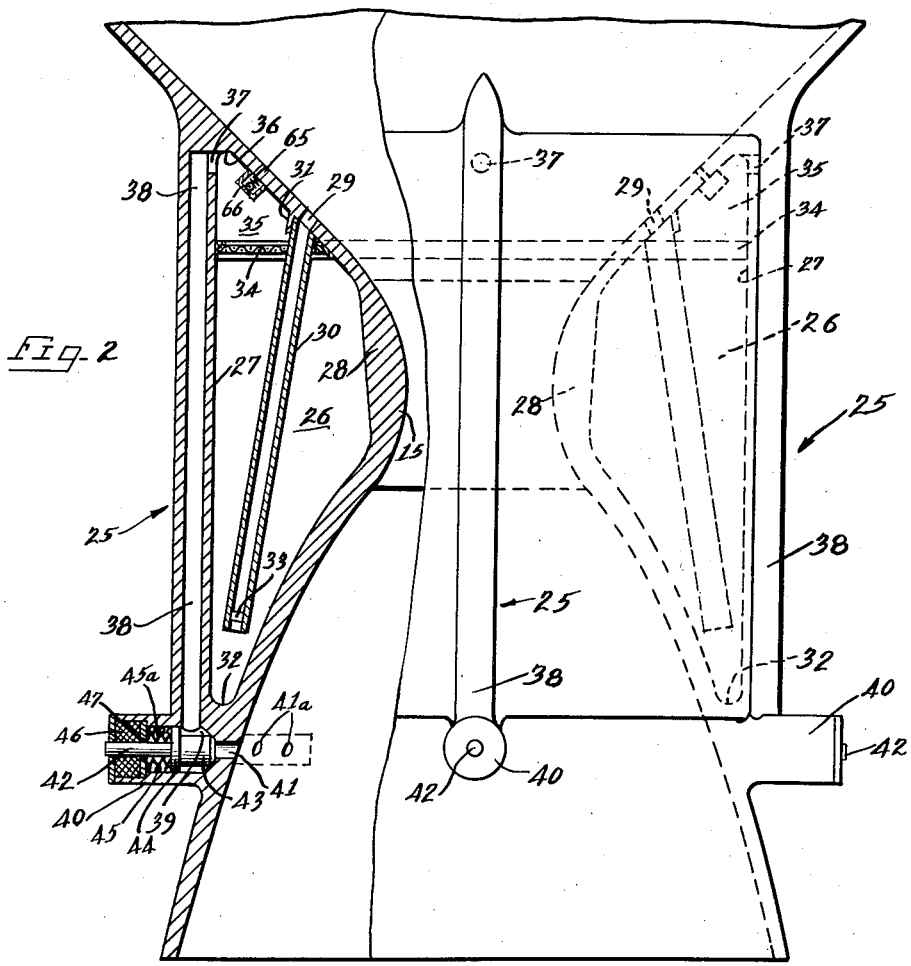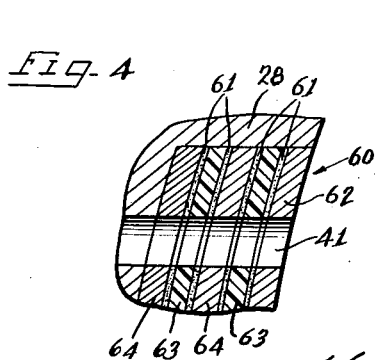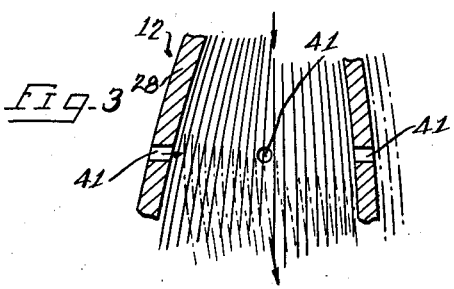

3,070,957
LIQUID SEPARATOR, VAPOR-GAS INJECTION STEERING SYSTEM
Max McCorkle, Kirtland, Willoughby, Ohio, assignor to Thompson Ramo Wooldridge Inc., Cleveland, Ohio, a corporation of Ohio
Filed Mar. 16, 1961, Ser. No. 96,202
5 Claims. (Cl. 60—35.55)

This invention relates to air and space borne vehicles and is more particularly directed to attitude control of such vehicles by controlling the direction and magnitude of the thrust vector of the exhaust gases of the main reaction motor.

Heretofore, the main reaction motor exhaust gases have not, as far as I am aware, been employed for any purpose other than providing thrust to the vehicle with which the reaction motor is associated because of the extremely high temperature of the exhaust gases. In addition to the high temperature problem, partciularly, with solid propellants, solid particles prevented employment of such main reaction motor gases for operation of auxiliary components of the vehicle with which the reaction motor is associated, such as turbines, pumps, and the like.

It has also been customary in the art for attitude control of such vehicles to employ gimbaled nozzles and reaction motors as well as jet vanes constructed of refractory material positioned in the exhaust gas flow from the nozzle of the reaction motor. These attitude control systems required complicated actuating mechanisms and added considerably to the weight and stability problems of such air and space borne vehicles.

By employment of the present invention wherein a portion of the exhaust gases emanating from the main reaction chamber into the gas discharge nozzle are bled or by-passed and thereafter cooled to temperatures permitting their ready application with auxiliary components constructed of readily available materials and the cooled gases filtered and thereafter injected into the exit portion of the gas discharge nozzle to create transverse shock waves in the main body of exhaust gases flowing through the nozzle to change the direction of the thrust vector of the exhaust gases, I overcome the problems and difficulties of the prior art and control the attitude of the air of space borne vehicle in the pitch and yaw planes.

It is therefore an object of the present invention to provide improved systems for controlling the attitude of an air or space borne vehicle.

Another object of the present invention is to provide a system for controlling the attitude of an air or space borne vehicle wherein cooled exhaust gases from the main reaction motor of the vehicle are injected into the exit portion of the gas discharge nozzle to create shock waves in the main flow of exhaust gases in the nozzle to thereby change the direction and magnitude of the exhaust gas thrust vector to thereby control the attitude of the vehicle in the pitch and yaw planes.

Another object of the present invention is to provide a thrust vector control system for air and space borne vehicles wherein the exhaust gases are bled from the reaction motor discharge nozzle and cooled and filtered to condition the hot exhaust gases for subsequent use.

A still further object of the present invention is to provide improved methods for controlling the orientation of an air or space borne vehicle.

A still further object of the present invention is to provide an improved method for cooling and filtering exhaust gases emanating from the reaction chamber of an air or space borne vehicle.

These and other objects, features and advantages of the present invention will become apparent upon a careful consideration of the following detailed description, when considered in conjunction with the accompanying drawings, wherein like reference numerals and characters refer to like and corresponding parts throughout the several views.

On the drawings:

FIGURE 1 is a generally schematic view of an air or space borne vehicle employing the features of the present invention in fragmentary partial section.

FIGURE 2 is an enlarged fragmentary view in partial section illustrating the exhaust gas thrust vector control feature of the present invention.

FIGURE 3 is an enlarged fragmentary view in partial section illustrating the exhaust gas thrust vector control feature of the present invention.

FIGURE 4 is a view illustrating a laminated nozzle structure found useful in the present invention.

FIGURE 5 illustrates in elevation an alternative embodiment of the present invention.

FIGURE 6 is a view taken along lines VI—VI of FIGURE 5.

As shown on the drawings:

Briefly stated, the present invention involves bleeding a portion of the exhaust gases emanating from the main or primary reaction motor of an air or space borne vehicle, flowing the hot and discrete particle containing bled gases through a fluid which cools the gases and filters the gases by holding the discrete particles in suspension, flowing the filtered gas and vapors of the filtering and cooling liquid through a secondary screening member which dampens flow of the gas, and metering the dampened mixture of filtered and cooled exhaust gases and liquid vapors into the interior of the exhaust gas discharge nozzle downstream of the throat thereof to create oblique shock waves to thereby change the direction and magnitude of the main body of exhaust gases flowing axially through the exit portion of the discharge nozzle to thereby control the attitude of the vehicle in the pitch and yaw planes.

In accomplishing the above, the apparatus appearing in FIGURE 1 may be employed. As shown therein, an air or space borne vehicle, generally indicated by the numeral 7, may include a front end portion or nose 8 of generally conical configuration, a body portion or fuselage 9 which may house the guidance and associated components of the vehicle, not shown, and an opposed end portion 10 housing the reaction motor 11 and integral discharge nozzle 12. The end portion 10 of the vehicle may be provided with an outwardly flaring lip 11a.

The exhaust nozzle 13, when formed integral with the reaction chamber 11 simplifies the construction and fabrication problems associated with the design of the overall vehicle. The requirements for close tolerance fits, expansion and contraction ratio determinations of materials of construction of separate nozzle and reaction chambers, of employment of bellows and other seals, gimbal mechanisms, and the like, may be substantially eliminated by employment of the attitude control system of the present invention. These design problems have currently caused considerable difficulty in establishing design standards, added to the weight of the vehicle, and required cowling apparatus presenting aerodynamic stability problems.

Heretofore, the auto pilot system of air and space borne vehicles controlled several servomechanisms which changed the orientation of gimbaled nozzles, reaction motors, jet vanes and the like for controlling the attitude of the vehicle.

As appears in FIGURE 2, a plurality of thrust vector control devices 25 may be arranged on the exterior of the reaction nozzle 12. A pair of diametrically opposed thrust control devices 25 may be provided for controlling yaw movement as may be a pair of thrust control devices for controlling movement of the vehicle in the pitch plane.

With particular reference to the thrust control device 25a shown to the left as viewed in FIGURE 2, a torodial chamber 26 may be defined by an outer wall 27 and the wall 28 of the exhaust nozzle. This annular chamber 26 is provided with a fluid medium, such as water, which will cool the discharge nozzle wall 28. A passage 29 is formed in the inlet portion of the nozzle and a passaged conduit 30 may be secured as by a fitting 31 to the nozzle wall communicating passage 29 and the passage of the conduit 30. Conduit 30 may be an elongated cylinder extending into the fluid in chamber 26 and terminating with an open end adjacent the bottom wall 32 of the chamber 26. A burst or melt plug 33 may be provided for closing the end of the conduit 30 adjacent the end wall 32 for storage and handling purposes. Secured in the chamber 26 is an annular baffling or screen member 34 which operates to prevent passage of solid particles and dampens flow of gas through the liquid medium in chamber 26. The baffle member 34 defines with the wall 27 and reaction motor nozzle wall an outlet chamber 35. The liquid in chamber 26 is at a level below the baffle member 34 and below the upper end wall 36 of the chamber 35 to permit flow of a mixture of cooled exhaust gases and vaporized fluid through a passage 37 formed in wall 27 adjacent the upper end 36 of the chamber 35. Passage 37 communicates with a downwardly directed conduit 38 which communicates with a valve chamber 39 of a valve assembly 40. Chamber 39 communicates with a passage 41 formed in the wall of the nozzle downstream of the nozzle throat 15.

The valve assembly may be a solenoid valve and include a stem 42 carrying a head 43 normally closing passage 41. A piston 44 may be carried by the valve stem 42 to guide the valve. The head 44 divides the piston housing into chamber 39 and a chamber 45 which may be provided with an annular bellows secured to the piston head and to the end cap 46 secured to the housing. The bellows 45a seals the valve from the gas passage. Appropriate bearings and seal 47 are provided for the valve stem 42. Energization of the solenoid of the valve assembly 40 may be provided from the auto pilot unit 46 of the vehicle 7. Thus, means are provided for selectively actuating the proper thrust control device 25 for injecting a predetermined and metered quanity of a mixture of cooled and filtered exhaust gases and vaporized liquid into the interior of the nozzle exit portion. The valve arrangement 40, it will be understood, permits modulation and thereby control of the rate of flow of the mixture of cooled and filtered exhaust gases and vaporized fluid into the passage 41.

In operation, hot exhaust gases from the reaction chamber enter passage 29 and conduit 30. These hot gases burst or burn out the plug 33 and are forced into the liquid in chamber 26 adjacent the end 32 of the chamber. The liquid cools the gas to temperatures sufficiently low to cause particle solidification and additionally filters the gas by holding these discrete solid particles in suspension. The filtered gas and vaporized liquid then pass upward through the dampening screen member 34 into the upper part of chamber 35 and then into passage 37. The auto pilot unit 46 actuates the solenoid of the valve 40 and opens chamber 39 thereby communicating conduit 38 and passage 41. The pressure differential created in passages 41 and 38 by opening of the valve 40 controls the rate of flow of the mixture of exhaust gases and vaporized fluid into passage 41. Thus, the position of the valve head in chamber 39 may be varied to modulate the rate of flow of the aforesaid mixture through passage 41 into the exit portion of nozzle 12.

It will be understood that the details of construction of each of the thrust control devices 25 and 25a are similar.

The mixture of cooled and filtered exhaust gases and vaporized fluid flowing into the interior of the exit portion of the nozzle create transverse or oblique shock wave disturbances in the main flow of exhaust gases through the nozzle. These shock waves change the direction of flow of the main body of exhaust gases and thereby the thrust vector of the exhaust gases, and, depending on the magnitude of the shock waves, the magnitude of the change of direction of the exhaust gases thrust vector is controlled. The magnitude of the shock waves is controlled by the modulating valve and thereby the magnitude of the change of the thrust vector may be controlled.

It will be appreciated that the passage 41 may communicate through a manifold arrangement (not shown) with a plurality of passages 41a opening into the interior of the exit portion of the exhaust gas nozzle to thereby control the thrust vector changes more precisely. In addition, it will be appreciated that a plurality of thrust control devices 25 and 25a may be provided for introducing cooled exhaust gases for controlling the attitude of the vehicle.

It will also be appreciated that the inner wall of the exhaust nozzle will ablate during operation and that if the outlet 41 is formed directly in the wall 28 of the nozzle the wall and nozzle length will ablate proportionately with the remainder of the nozzle wall. If desired, a laminated stack 60 of refractory and insulating wafers may be bonded together by a low melting point adhesive. As heat transfer occurs in the nozzle, after rocket engine ignition, heat is conducted through the laminated stack 60. When the melting temperature of the first or innermost adhesive joint 61 is reached, the refractory disk 62 preceding it, i.e., the innermost disk, is freed and localized exhaust gas pressure expels it through the nozzle. The process of heat transfer proceeds through the insulating plastic wafer 63 and the next refractory disk 64 until the refractory disk 64 is unbonded and expelled through the nozzle. The adhesive melting temperature and insulating plastic are chosen from such materials as high temperature adhesives and phenolic resins to thereby duplicate the rate of heat regressive ablation of the rocket nozzle wall. Thus, both the throat 15 and nozzle wall regressively ablate at the same rate and no surface discontinuity is thereby presented to the primary exhaust gas flow from the nozzle.

Referring to FIGURE 2, when the vehicle has returned to its proper of programmed orientation as a result of the change in the direction and magnitude of the exhaust gas thrust vector, the auto pilot unit 46 deenergizes the solenoid of the valve 40 and a spring 41b returns the valve head to the closed position. When the valve 40 is closed the mixture of cooled exhaust gases and vaporized fluid is vented by bleeding through a passage 65 formed in the nozzle inlet wall which is normally closed by a ball and detent arrangement 66. Forces due to the acceleration of gravity maintain the liquid level in the chamber 26 in the desired operating position.

It is to be understood that the nozzle of the primary reaction motor may be mounted in a gimbal arrangement and that changes induced by the shock waves in changing the direction of the exhaust gas thrust vector are sufficient to cause a corresponding change in the direction of movement of the vehicle in the pitch or yaw planes. As exemplified in FIGURE 5, a plurality of the thrust control devices 25 and 25a may be arranged around the nozzle and the proper number of the devices 25 selectively actuated by the auto pilot unit for flowing the mixture of cooled and filtered exhaust gases and vaporized fluid obliquely into the interior of the exhaust nozzle to thereby increase the degree of control of both the magnitude and direction of the exhaust gas thrust vector. (FIGURE 3).

It will be noted that in the embodiment shown in FIGURE 5, the nozzle and reaction chamber 11 are not formed integrally and the nozzle is gimbaled.

The nozzle entrance portion 12 is sized to the wall 12a of the reaction chamber 11 to provide a ball and socket joint thereby permitting swiveling or gimbal movement of the nozzle 13. An annular seal 17 may be provided to prevent gas leakage between the nozzle and reaction chamber wall 12a.

The exhaust nozzle 13 is of the DeLaval type and may be secured in a gimbal arrangement 18 which clearly appears in FIGURE 5. The gimbal arrangement 18 includes an annular ring 19 pinned as at 20 and 21 to the nozzle 13 at an appropriate location, such as the throat 15 thereof, for movement of the nozzle in the pitch plane which is the vertical plane as appears in FIGURE 6. The ring 19 is pinned as at 22 and 23 for oscillation in a semi-circular ring 24 which is secured as at 24a to the wall of the nozzle exit portion 10. Ring 24 permits movement of the nozzle in the yaw plane.

Thus, by the application of a directional force to the reaction motor nozzle, the thrust vector direction of a nozzle exhaust gases may be changed to thereby control the attitude of the vehicle in both the pitch and yaw planes.

It will therefore be appreciated that with my invention, I provide simple and effective thrust vector control and thereby attitude control for the vehicle while providing means for cooling reaction motor exhaust gases to temperatures permitting their employment for attitude control purposes. It will also be appreciated that the cooled exhaust gases may be by-passed for operation of auxiliary components of the vehicle with which the exhaust gas cooling apparatus is employed, such as turbines utilized to operate pumps of the fuel feed system supplying fuel components to the reaction chamber.

Although various minor modifications might be suggested by those versed in the art, it is to be understood that I wish to embody within the scope of the patent warranted hereon all such embodiments as reasonably and properly come within the scope of my contribution to the art.

I claim as my invention:

1. A system adapted to control the attitude of air and space borne vehicles propelled by the thrust produced by exhaust gases generated in a reaction motor and discharging through an exhaust nozzle comprising: a first port formed in the nozzle wall, a second port formed in the nozzle wall downstream of the first port, an annular vaporizable cooling medium container defining an inner chamber having a common wall with said exhaust nozzle, first means passing exhaust gases received from the first port through a vaporizable cooling medium in said container to form a cooled mixture of exhaust gases and vaporized cooling medium, and second means communicating with the container and the second port for supplying the cooled mixture in impinging relation through the second port on the primary body of exhaust gases flowing through the nozzle to thereby cause changes in the direction of the thrust vector of the primary body of flowing exhaust gases and the inner chamber of said container having a larger cross-sectional diameter than said first means and said second means.

2. A system adapted to control the attitude of air and space borne vehicles propelled by the thrust produced by exhaust gases generated in a reaction motor and discharging through an exhaust nozzle comprising: a first port formed in the nozzle wall upstream of the nozzle throat, a second port formed in the nozzle wall downstream of the first port, an annular vaporizable cooling medium container defining an inner chamber having a common wall with said exhaust nozzle, first means passing exhaust gases received from the first port through a vaporizable cooling medium in said container to form a cooled mixture of exhaust gases and vaporized cooling medium, and second means communicating with the container and the second port for supplying the cooled mixture in impinging relation through the second port on the primary body of exhaust gases flowing through the nozzle to thereby cause changes in the direction of the thrust vector of the primary body of flowing exhaust gases and the inner chamber of said container having a larger cross-sectional diameter than the first means and the second means.

3. A system adapted to control the attitude of air and space borne vehicles propelled by the thrust produced by exhaust gases generated in a reaction motor and discharging through an exhaust nozzle comprising: a first port formed in the nozzle entrance portion adjacent the reaction chamber of said reaction motor, a second port formed in the exit portion of the nozzle, first means passing the hot exhaust gases received from the first port through a vaporizable cooling medium to form a cooled mixture of exhaust gases and vaporized cooling medium, said vaporizable cooling medium being in an annular container, and second means communicating with said container and the second port for supplying the cooled mixture in impinging relation through the second port on the primary body of exhaust gases flowing through the nozzle to thereby cause changes in the direction of the thrust vector of the primary body of flowing exhaust gases, and said annular container having a larger cross-sectional inner diameter than said first means and said second means.

4. In a system adapted to control the attitude of air and space borne vehicles propelled by the thrust produced by exhaust gases generated in a reaction motor and discharging through an exhaust nozzle, apparatus for cooling exhaust gases comprising: a nozzle outlet port formed in the nozzle wall, a plurality of nozzle inlet ports formed in the nozzle wall downstream of the outlet port, an annular housing having a common wall with said exhaust nozzle for a vaporizable cooling fluid, first conduit means communicating with the nozzle outlet port and the housing and passing the hot exhaust gases through a body of a cooling medium in the housing, an outlet port in the housing, a filter in the housing for filtering the cooled mixture, second conduit means communicating with the housing outlet port and the nozzle inlet ports, said housing having an inner chamber of larger cross-sectional diameter than said first conduit means and said second conduit means, and means for selectively controlling flow to the inlet ports in response to a signal received from a remote source.

5. In a system adapted to control the attitude of air and space borne vehicles propelled by the thrust produced by exhaust gases generated in a reaction motor and discharging through an exhaust nozzle, apparatus for cooling the exhaust gases comprising: a nozzle outlet port formed in the wall of the nozzle, a plurality of nozzle inlet ports formed in the nozzle wall downstream of the outlet port, a housing for a vaporizable cooling fluid in heat exchange relation with the nozzle, first conduit means communicating with the nozzle outlet port and housing and passing the hot exhaust gases received from the nozzle outlet port through a body of a cooling medium in the housing to form a cooled mixture of exhaust gases and vaporized cooling medium in the housing, an outlet port in the housing, second conduit means communicating with the housing outlet port and the nozzle inlet ports, said housing having an inner chamber of larger cross-sectional diameter than said first conduit means and said second conduit means, and means for selectively controlling flow to the inlet ports in response to a signal received from a remote source.

References Cited in the file of this patent

UNITED STATES PATENTS

| | | |
|---|---|---|
| 2,790,506 | Van Vactor | Apr. 30, 1957 |
| 2,850,977 | Pollak | Sept. 9, 1958 |
| 2,875,578 | Kadosch et al. | Mar. 3, 1959 |
| 2,916,873 | Walker | Dec. 15, 1959 |
| 2,919,546 | David | Jan. 5, 1960 |
| 2,943,821 | Wetherbee | July 5, 1960 |
| 3,020,709 | Bertin et al. | Feb. 13, 1962 |